US009946959B2

(12) United States Patent
Hao et al.

(10) Patent No.: US 9,946,959 B2
(45) Date of Patent: Apr. 17, 2018

(54) FACILITATING INTERPRETATION OF HIGH-DIMENSIONAL DATA CLUSTERS

(71) Applicant: Hewlett Packard Enterprise Development LP, Houston, TX (US)

(72) Inventors: Ming C. Hao, Palo Alto, CA (US);
Wei-Nchih Lee, Palo Alto, CA (US);
Alexander Jaeger, Palo Alto, CA (US);
Nelson L. Chang, San Jose, CA (US);
Daniel Keim, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 26 days.

(21) Appl. No.: 15/307,026

(22) PCT Filed: Apr. 30, 2014

(86) PCT No.: PCT/US2014/036154
§ 371 (c)(1),
(2) Date: Oct. 27, 2016

(87) PCT Pub. No.: WO2015/167526
PCT Pub. Date: Nov. 5, 2015

(65) Prior Publication Data
US 2017/0046597 A1 Feb. 16, 2017

(51) Int. Cl.
*G06K 9/00* (2006.01)
*G06K 9/62* (2006.01)

(52) U.S. Cl.
CPC ............ *G06K 9/6224* (2013.01); *G06K 9/00* (2013.01); *G06K 9/6215* (2013.01);
(Continued)

(58) Field of Classification Search
CPC .. G06K 9/6224; G06K 9/6215; G06K 9/6235; G06K 9/00627; G06K 2009/6236;
(Continued)

(56) References Cited

U.S. PATENT DOCUMENTS

| 6,226,408 B1 * | 5/2001 | Sirosh | G06K 9/6223 |
| | | | 382/156 |
| 7,043,500 B2 | 5/2006 | Leary | |

(Continued)

OTHER PUBLICATIONS

"Generating a Multi-dimensional Model"; 5 pages; printed on Oct. 25, 2016 from: http://www.oracle.com/webfolder/technetwork/tutorials/obe/db/11g/r2/prod/appdev/sqldev/datamodel3genmulti/datamodel3genmulti_otn.htm?print=preview.

(Continued)

*Primary Examiner* — Amir Alavi

(57) ABSTRACT

In an example, high-dimensional data is projected to a multi-dimensional space to differentiate clusters of the high-dimensional data. A user selection of at least two of the clusters may be received and a plurality of dissimilar dimensions may be extracted from the at least two clusters. In addition, a user selected of a dissimilar dimension from the plurality of extracted dissimilar dimensions may be received. In response to receipt of the user selection of the dissimilar dimension from the plurality of dissimilar dimensions, a plurality of correlated dimensions to the dissimilar dimension may be determined. In addition, the plurality of dissimilar dimensions and the plurality of correlated dimensions may be displayed.

15 Claims, 8 Drawing Sheets

(52) U.S. Cl.
CPC ......... *G06K 9/6218* (2013.01); *G06K 9/6235* (2013.01); *G06K 2009/6236* (2013.01)

(58) Field of Classification Search
CPC ........ G06T 17/05; G09B 29/106; H03M 1/00; H03M 2201/01
See application file for complete search history.

(56) References Cited

U.S. PATENT DOCUMENTS

| | | | |
|---|---|---|---|
| 7,660,822 | B1 | 2/2010 | Pfleger |
| 7,777,743 | B2 | 8/2010 | Pao et al. |
| 2003/0009470 | A1* | 1/2003 | Leary ................ G06F 17/30333 |
| 2003/0224344 | A1* | 12/2003 | Shamir .................. G06F 19/24 435/4 |
| 2005/0021528 | A1* | 1/2005 | Andreev ........... G06F 17/30598 |
| 2008/0162098 | A1* | 7/2008 | Suarez-Rivera ........ E21B 49/00 703/10 |
| 2008/0319674 | A1* | 12/2008 | Dai .......................... G01V 1/30 702/6 |
| 2009/0097733 | A1* | 4/2009 | Hero, III .............. G06K 9/6215 382/133 |
| 2010/0198900 | A1 | 8/2010 | Gifford |
| 2010/0313157 | A1 | 12/2010 | Carlsson et al. |
| 2011/0131169 | A1* | 6/2011 | Yoshimoto ........... G06K 9/6215 706/52 |
| 2012/0311496 | A1 | 12/2012 | Coa et al. |
| 2017/0046597 | A1* | 2/2017 | Hao ........................ G06K 9/00 |

OTHER PUBLICATIONS

You, Q. et al.; "Iterative Visual Analytics and Its Applications in Bioinformatics"; Dec. 2010; 116 pages.

* cited by examiner

FACILITATING INTERPRETATION OF HIGH-DIMENSIONAL DATA CLUSTERS

BACKGROUND

Cluster analysis is the task of grouping objects based on data that describes the objects and their relationships. The goal of cluster analysis is to group a set of objects in such a way that objects in a same group (i.e., a cluster) are more similar to each other than to objects in other groups. The greater the similarity (i.e., homogeneity) within a group and the greater the difference between groups, the better or more distinct the clustering. In cluster analysis, the unclassified results from a formal clustering algorithm are typically presented to a domain expert to interpret and validate the significance of the clusters.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
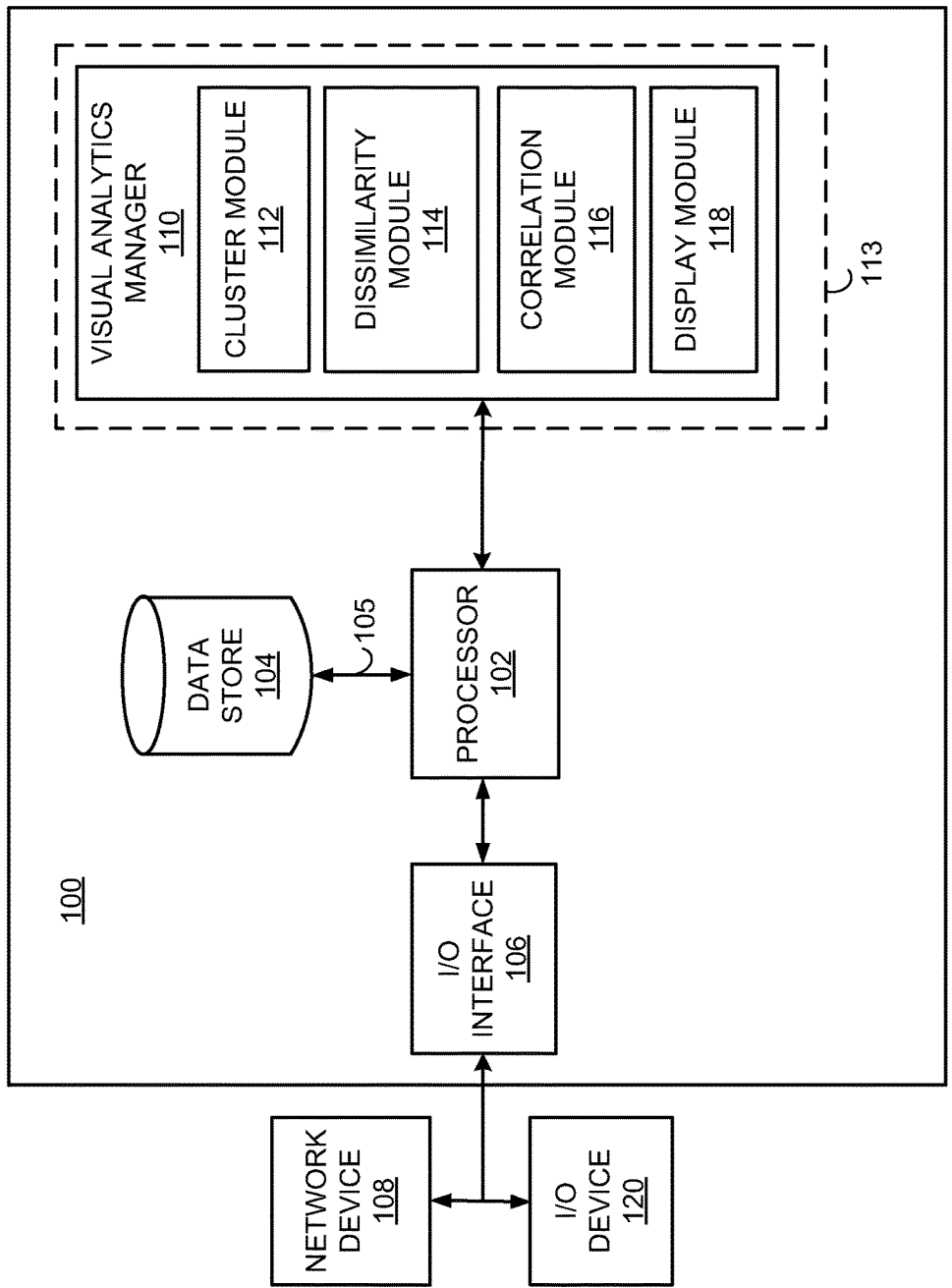
FIG. 1 shows a block diagram of a computing device to facilitate interpretation of high-dimensional data clusters, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of a method for facilitating interpretation of clusters of high-dimensional data by a user, such as a domain expert. The disclosed method, for instance, may be an interactive and iterative workflow that incorporates expert domain knowledge to allow the expert to refine their hypotheses. Particularly, the disclosed method is an interactive and iterative visual analytics method for facilitating interpretation of clusters of high-dimensional data. Interpretation of the clusters of high dimensional data may be facilitated through an analysis of patterns in clusters to determine the differences between clusters and to describe the dimensions of each cluster. In this regard, a user or domain expert may utilize the disclosed visual analytics method to dynamically compare the dimensions (i.e., attributes) of clusters in high-dimensional space to iteratively refine their cluster interpretations through interaction and reprojection of the user-selected clusters. Also disclosed herein is a computing device for implementing the methods and a non-transitory computer readable medium on which is stored machine readable instructions that implement the methods.

According to a disclosed example, high-dimensional data is projected to a multi-dimensional space to differentiate clusters. For instance, the multi-dimensional space may include, but is not limited to, two-dimensional (2D) space, three-dimensional (3D) space, and four-dimensional (4D) space (e.g., 4D=3D+time). The projected clusters of the disclosed examples are not explicitly constructed, but materialize due to their proximity in the projected multi-dimensional space. In other words, the projected clusters of the disclosed examples are not actively formed or estimated. A user selection of at least two of the clusters may be received and a plurality of dissimilar dimensions (i.e., dissimilar attributes) may be extracted from the at least two selected clusters. In addition, a user selection of a dissimilar dimension from the plurality of extracted dissimilar dimensions may be received. In response to receiving the user selection of the dissimilar dimension from the plurality of dissimilar dimensions, a plurality of correlated dimensions (i.e., correlated attributes) to the at least one dissimilar dimension may be determined. Thus, the plurality of dissimilar dimensions and the plurality of correlated dimensions may be displayed to a user, such as a domain expert, for interpretation of the at least two selected clusters. According to another example, the plurality of dissimilar dimensions that were extracted from the at least two clusters may be reprojected to the multi-dimensional space to differentiate a refined set of clusters. In this regard, a user may hone their interpretations by analyzing the reprojected clusters.

The disclosed examples may provide a simple iterative method and system for a user to rapidly interpret and then validate clusters of high-dimensional data obtained from a machine learning algorithm. High-dimensional data, for instance, includes twenty or more dimensions. Accordingly, the disclosed examples may provide an iterative and interactive approach that uses an attribute dissimilar measure and coordinate axis to enable users to visually interpret clusters in a high-dimensional space and continuously explore their interpretations and hypotheses in multiple industries such as the healthcare, communication, marketing, and technology industries.

With reference to FIG. 1, there is shown a block diagram of a computing device 100 that is to facilitate interpretation of clusters of high-dimensional data according to an example of the present disclosure. It should be understood that the computing device 100 may include additional components and that one or more of the components described herein may be removed and/or modified without departing from a scope of the computing device 100.

The computing device 100 is depicted as including a processor 102, a data store 104, an input/output (I/O) interface 106, and a visual analytics manager 110. For example, the computing device 100 may be a desktop computer, a laptop computer, a smartphone, a computing tablet, or any type of computing device. Also, the components of the computing device 100 are shown on a single computer as an example and in other examples the components may exist on multiple computers. The computing device 100 may store or manage high-dimensional data in a separate computing device, for instance, through a network device 108, which may include, for instance, a router, a switch, a hub, and the like. The data store 104 may include physical memory such as a hard drive, an optical drive, a flash drive, an array of drives, or any combinations thereof, and may include volatile and/or non-volatile data storage.

The visual analytics manager 110 is depicted as including a cluster module 112, a dissimilarity module 114, a correlation module 116, and a display module 118. The processor 102, which may be a microprocessor, a micro-controller, an application specific integrated circuit (ASIC), or the like, is to perform various processing functions in the computing device 100. The processing functions may include the functions of the modules 112-118 of the visual analytics manager 110. According to an example, the visual analytics manager 110 provides interactive and iterative visual analytics for facilitating interpretation of clusters of high-dimensional data.

The cluster module 112, for example, projects high-dimensional data to a multi-dimensional space to differentiate clusters. According to an example, the cluster module 112 implements a multi-dimensional scaling to project the high-dimensional data to multi-dimensional space that is then displayed by the display module 118, for instance, using a multi-dimensional projection, such as a multi-dimensional scaling, to visualize the differentiated clusters.

The dissimilarity module 114, for example, receives a user selection of at least two of the clusters from the multi-dimensional projection and extracts a plurality of dissimilar dimensions (i.e., dissimilar attributes) from the at least two selected clusters. According to an example, the dissimilarity module 114 may extract a number of most dissimilar dimensions. For instance, the dissimilarity module 114 may extract the top ten most dissimilar dimensions. In order to determine the most dissimilar dimensions from the at least two clusters, the dissimilarity module 114 may calculate a difference distribution for the plurality of dissimilar dimensions using a normalized attribute dissimilar measure and may rank the plurality of dissimilar dimensions based on the calculated difference distribution, according to an example.

The correlation module 116, for example, receives a user selection of a dissimilar dimension from the plurality of extracted dissimilar dimensions and determines a plurality of dimensions that are correlated to the user selected dissimilar dimension. According to an example, the correlation module 116 extracts a number of correlated dimensions (i.e., correlated attributes). For instance, the correlation module 116 may determine the top ten most correlated dimensions. In order to determine the most correlated dimensions to the user selected dissimilar dimension, the correlation module 116 may calculate a correlation distribution for the dissimilar dimension using a Peterson equation, for instance, and may then rank a plurality of correlated dimensions based on the calculated correlation distribution.

The display module 118, for example, displays the differentiated clusters, the plurality of dissimilar dimensions, and the plurality of correlated dimensions for analysis by a user, for instance a domain expert. That is, for instance, the display module 118 displays the differentiated clusters projected by the cluster module 112. Further, the display module 118 may display a number of dimensions from the plurality of dissimilar dimensions and a number of dimensions from the plurality of correlated dimensions as coordinate axis. According to an example, the display module 118 highlights a path of a most traversed line in the coordinate axis by applying a scaled transparency to other lines in the coordinate axis to reduce overlapping of lines in the coordinate axis. For example, the more a line is traversed the more solid the line appears and the less a line is traversed the more transparent the line appears.

In an example, the visual analytics manager 110 includes machine readable instructions stored on a non-transitory computer readable medium 113 and executed by the processor 102. Examples of the non-transitory computer readable medium include dynamic random access memory (DRAM), electrically erasable programmable read-only memory (EEPROM), magnetoresistive random access memory (MRAM), memristor, flash memory, hard drive, and the like. The computer readable medium 113 may be included in the data store 104 or may be a separate storage device. In another example, the visual analytics manager 110 includes a hardware device, such as a circuit or multiple circuits arranged on a board. In this example, the modules 112-118 are circuit components or individual circuits, such as an embedded system, an ASIC, or a field-programmable gate array (FPGA).

The processor 102 may be coupled to the data store 104 and the I/O interface 106 by a bus 105 where the bus 105 may be a communication system that transfers data between various components of the computing device 100. In examples, the bus 105 may be a Peripheral Component Interconnect (PCI), Industry Standard Architecture (ISA), PCI-Express, HyperTransport®, NuBus, a proprietary bus, and the like.

The I/O interface 106 includes a hardware and/or a software interface. The I/O interface 106 may be a network interface connected to a network through the network device 108, over which the visual analytics manager 110 may receive and communicate information. For example, the input/output interface 106 may be a wireless local area network (WLAN) or a network interface controller (NIC). The WLAN may link the computing device 100 to the network device 108 through a radio signal. Similarly, the MC may link the computing device 100 to the network device 108 through a physical connection, such as a cable. The computing device 100 may also link to the network device 108 through a wireless wide area network (WWAN), which uses a mobile data signal to communicate with mobile phone towers. The processor 102 may store information received through the input/output interface 106 in the data store 104 and may use the information in implementing the modules 112-118.

The I/O interface 106 may be a device interface to connect the computing device 100 to one or more I/O devices 120. The I/O devices 120 include, for example, a display, a keyboard, a mouse, and a pointing device, wherein the pointing device may include a touchpad or a touchscreen. The I/O devices 120 may be built-in components of the computing device 100, or located externally to the computing device 100. The display may be a display screen of a computer monitor, a smartphone, a computing tablet, a television, or a projector.

Figure 2:
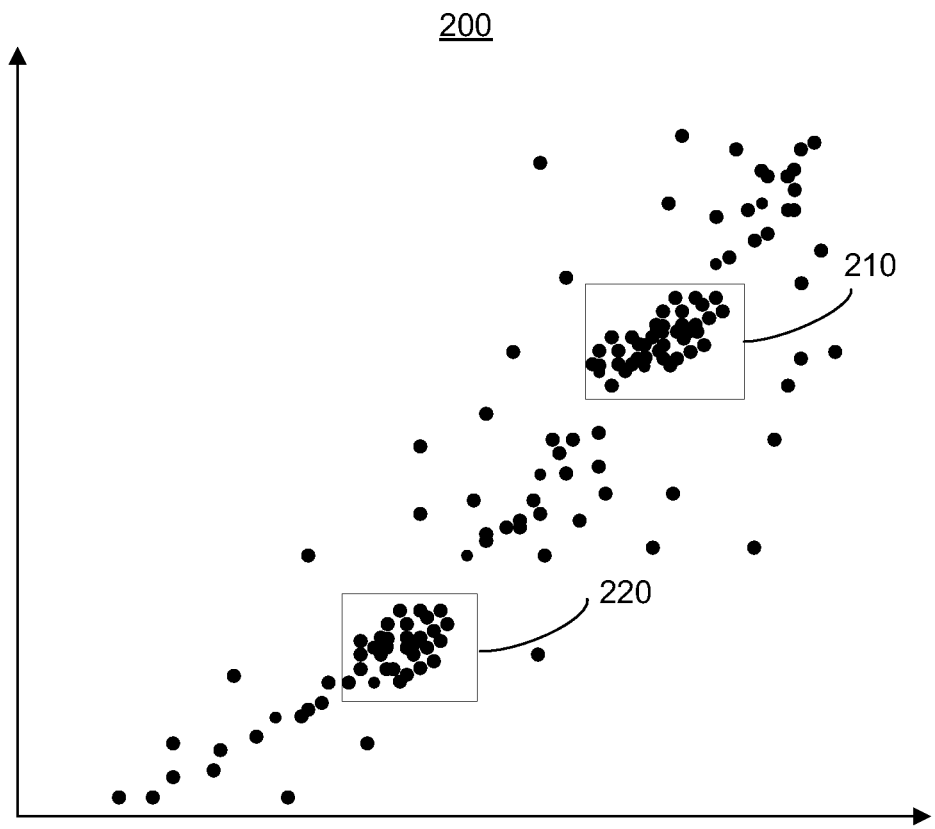
FIG. 2 shows a projection of high-dimensional data to multi-dimensional space, according to an example of the present disclosure.
Figure 3:
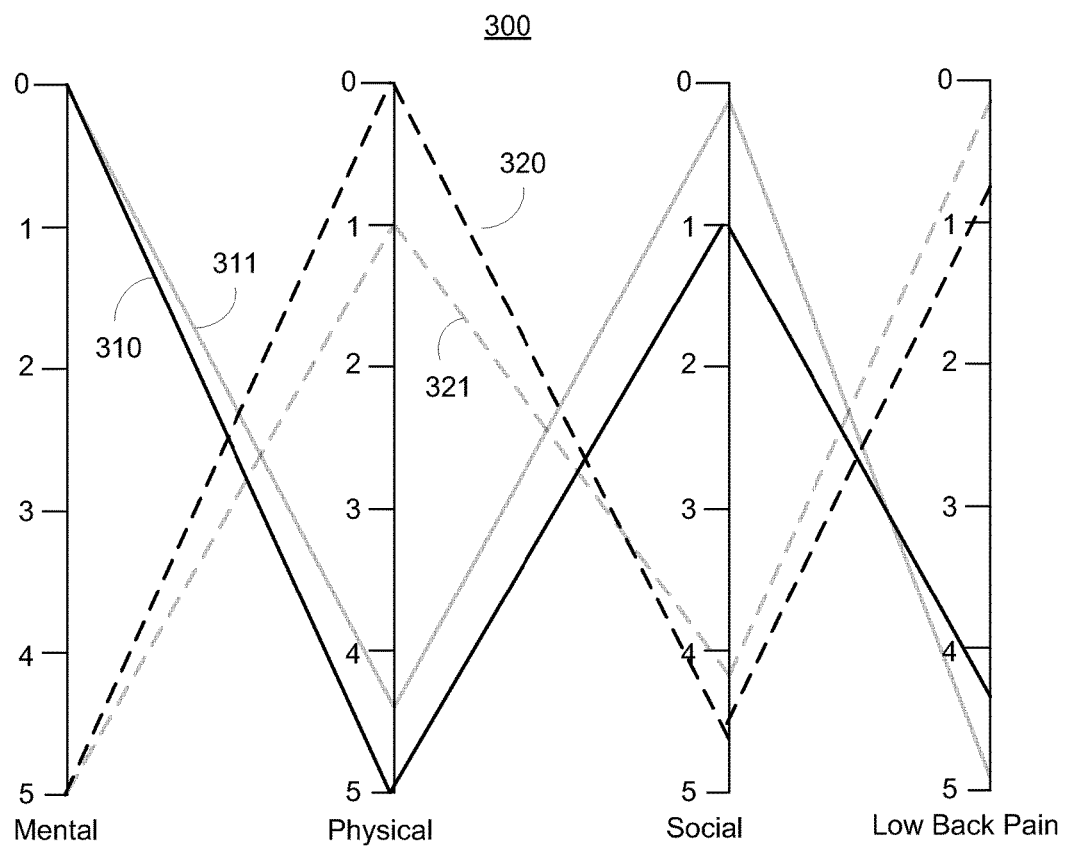
FIG. 3 shows a coordinate axis of dissimilar dimensions for selected clusters, according to an example of the present disclosure.
Figure 4:
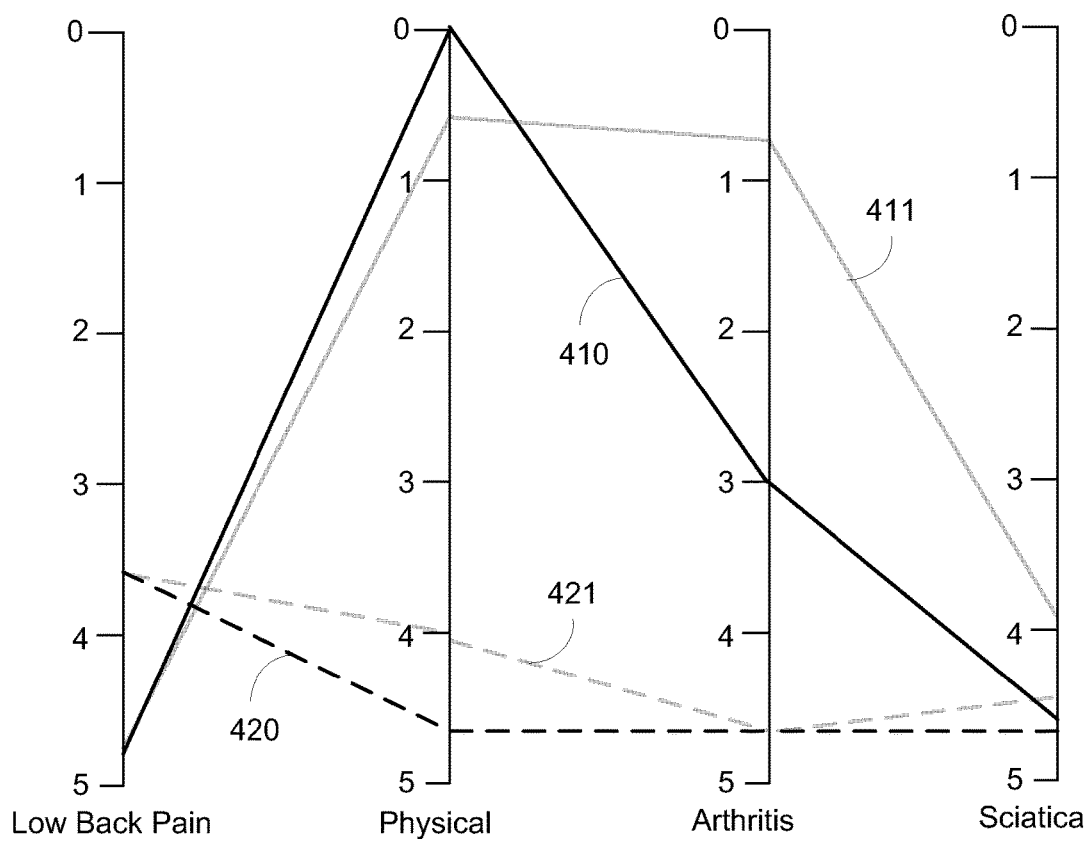
FIG. 4 shows a coordinate axis of dimensions correlated to a selected dissimilar dimension, according to an example of the present disclosure.

FIGS. 2-4 depict examples of an interactive and iterative visual analytics method for interpreting clusters of high-dimensional data. In this regard, a user may dynamically compare the dimensions of clusters in high-dimensional space to iteratively refine their interpretations through interaction and reprojection of a pair of user-selected clusters.

FIG. 2 depicts a projection 200 of high-dimensional data to multi-dimensional space, according to an example of the present disclosure. As noted above, the multi-dimensional space may include, but is not limited to, 2D space, 3D space, and 4D space. In the example shown in FIG. 2, the cluster module 112 may implement multi-dimensional scaling, for instance, to project high-dimensional data into a 2D space. The multi-dimensional scaling, however, may be optimized to preserve the relations between high dimensional points after the projection to 2D space. That is, data points that are close together in the original data set remain close together after the projection to 2D space.

Referring to FIG. 2, a user may, for example, select two clusters (i.e., a group of nearby data points) 210, 220 from the high-dimensional 2D projection 200 to compare the properties of their respective dimensions. For instance, the user may select a cluster using an I/O device 120 such as a keyboard, mouse, or a pointing device. According to an example, the display module 118 presents the two clusters 210, 220 in different colors in order to distinguish the two clusters. For instance, cluster 210 may be depicted in green and cluster 220 may be depicted in red.

FIG. 3 depicts a coordinate axis 300 of the most dissimilar dimensions of the two selected clusters, according to an example of the present disclosure. In this example, the coordinate axis 300 displays the top four most dissimilar dimensions from the two selected clusters 210, 220. In this example, the top four most dissimilar dimensions for the two selected clusters 210 and 220 are mental, physical, social, and low back pain. According to an example, the top four dissimilar dimensions are determined by an attribute dissimilar measure as described further below.

In FIG. 3, different characteristic properties (i.e., dimensions) of the two selected clusters are shown by respective lines 310, 311, 320, and 321. Particularly, the solid lines 310 and 311 represent different dimensions of cluster 210. According to an example, the solid lines 310 and 311 may be depicted in a color, for instance green, to indicate that they represent dimensions of cluster 210. Further, the dashed lines 320 and 321 represent different dimensions of cluster 220. According to an example, the dashed lines 320 and 321 may also be depicted in a color, for instance red, to indicate that they represent dimensions of cluster 220.

In FIG. 3, the number of displayed lines is limited to four for simplification. As such, the coordinate axis 300 may include any number of lines to represent a much larger number of dimensions for the selected dissimilar dimensions. Accordingly, to reduce the amount of overlap of lines, a path of a most traversed line in the coordinate axis 300 may be highlighted by applying a scaled transparency to other lines in the coordinate axis. As shown in FIG. 3, for example, a scaled transparency is applied to solid line 311 to highlight the more traversed solid line 310. Also, in this example, a scaled transparency is applied to dashed line 321 to highlight the more traversed dashed line 320.

Referring to FIG. 3, a user may determine that cluster 210, whose dimensions are represented by solid lines 310 and 311, appear to indicate more physical dimensions, such as low back pain. For example, solid lines 310 and 311 appear to show high measurement degrees (e.g., approximately 4-5 measurement degrees) for the physical and low back pain dimensions. On the other hand, dashed lines 320 and 321 appear to show low measurement degrees (e.g., approximately 0-1 measurement degrees) for the mental and social dimensions. Additionally, a user may determine that cluster 220, whose dimensions are represented by lines dashed lines 320 and 321, appear to indicate more mental dimensions, such as social issues. That is, dashed lines 320 and 321 appear to show high measurement degrees (e.g., approximately 4-5 measurement degrees) for mental and social dimensions. However, dashed lines 320 and 321 appear to show low measurement degrees (e.g., approximately 0-1 measurement degrees) for the physical and low back pain dimensions.

FIG. 4 depicts a coordinate axis 400 of the most correlated dimensions to a selected dissimilar dimension, according to an example of the present disclosure. A user, for instance, may select the low back pain dimension from coordinate axis 300 in FIG. 3 to further analyze. According to the example in FIG. 4, the top three dimensions that are correlated to the low back pain dimension are calculated and displayed in coordinate axis 400. In this example, the top three correlated dimensions to low back pain are the physical, arthritis, and sciatica dimensions.

Lines 410, 411, 421, and 422 for the two selected clusters 210 and 230 are also displayed in the coordinate axis 400 to show the paths of correlated dimensions (e.g., illness symptoms). A user may observe that there are two different clusters represented by the lines 410, 411, 420, and 421. For example, the solid lines 410 and 411 represent correlation properties of cluster 210, and may also be depicted in a color, for instance green. Also, the dashed lines 420 and 421 represent correlation properties of cluster 220, and may be depicted in a color, for instance red. Accordingly, a user may read the dimensions to understand their correlation.

As discussed above in FIG. 3, the number of displayed lines is limited to four for simplification. As such, the coordinate axis 400 may include any number of lines to represent all of the correlation properties of the selected clusters. Also, to reduce the amount of overlap of lines, a path of the more traversed lines (i.e., solid line 410 and dashed line 420) may be highlighted by applying a scaled transparency to solid line 411 and dashed line 421 in the coordinate axis 400.

Figure 5:
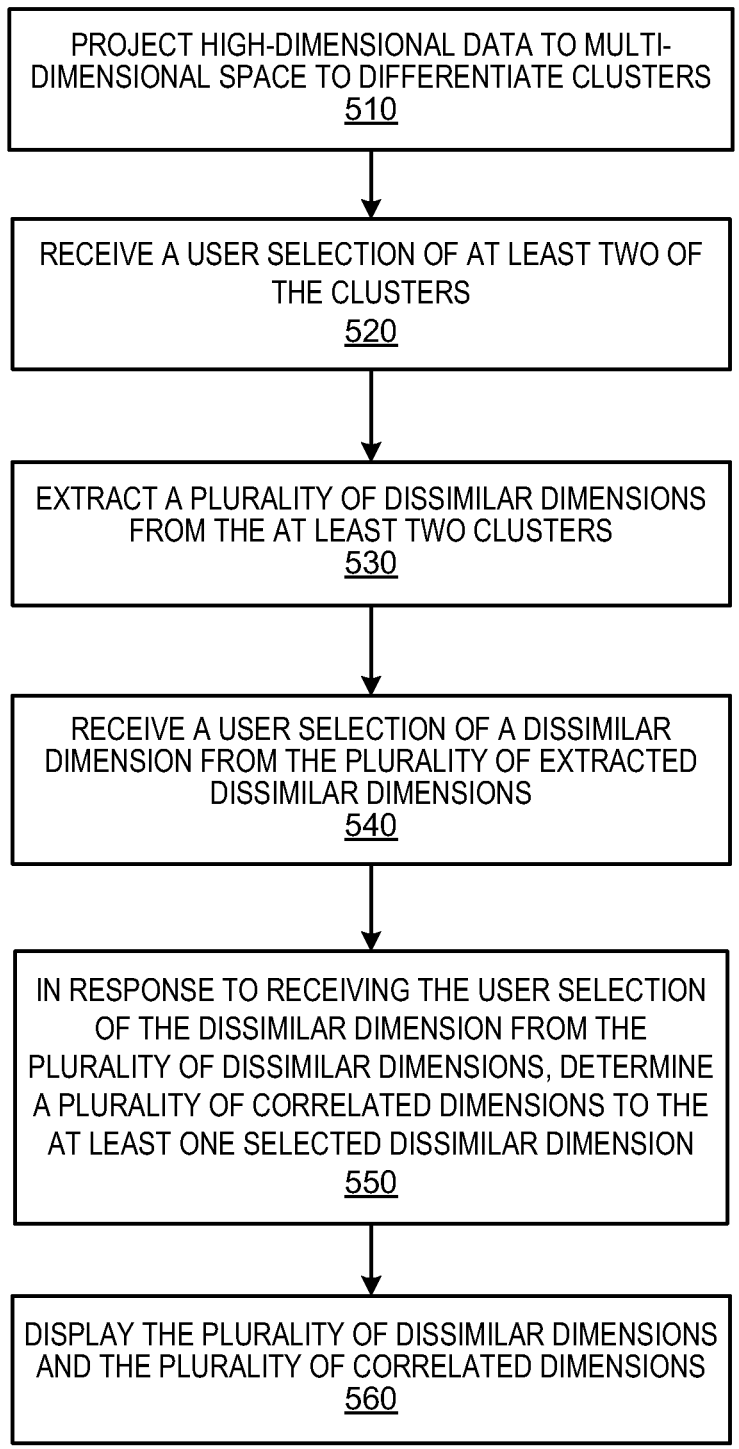
FIG. 5 shows a flow diagram of a method to facilitate interpretation of high-dimensional data clusters, according to an example of the present disclosure.

With reference to FIG. 5, there is shown a flow diagram of a method 500 for facilitating interpretation of clusters of high-dimensional data, according to an example of the present disclosure. The method 500 is implemented, for example, by the processor 102 of computing device 100 as depicted in FIG. 1.

In FIG. 5, the cluster module 112, for instance, projects high-dimensional data into a multi-dimensional space to differentiate clusters, as shown in block 510. For example, the cluster module 112 applies a multi-dimensional scaling to the high-dimensional data to generate an overview of the clusters using input from a dissimilarity matrix, which may be based on a Euclidean distance measure. According to an example, the projected data is displayed by the display module 118, for instance, using a high-dimensional 2D space 600 to visualize the projected clusters. An example of a high-dimensional 2D projection 610 that is projected by the cluster module 112 is shown in the top panel of the graphical user interface (GUI) 600 in FIG. 6.

Figure 6:
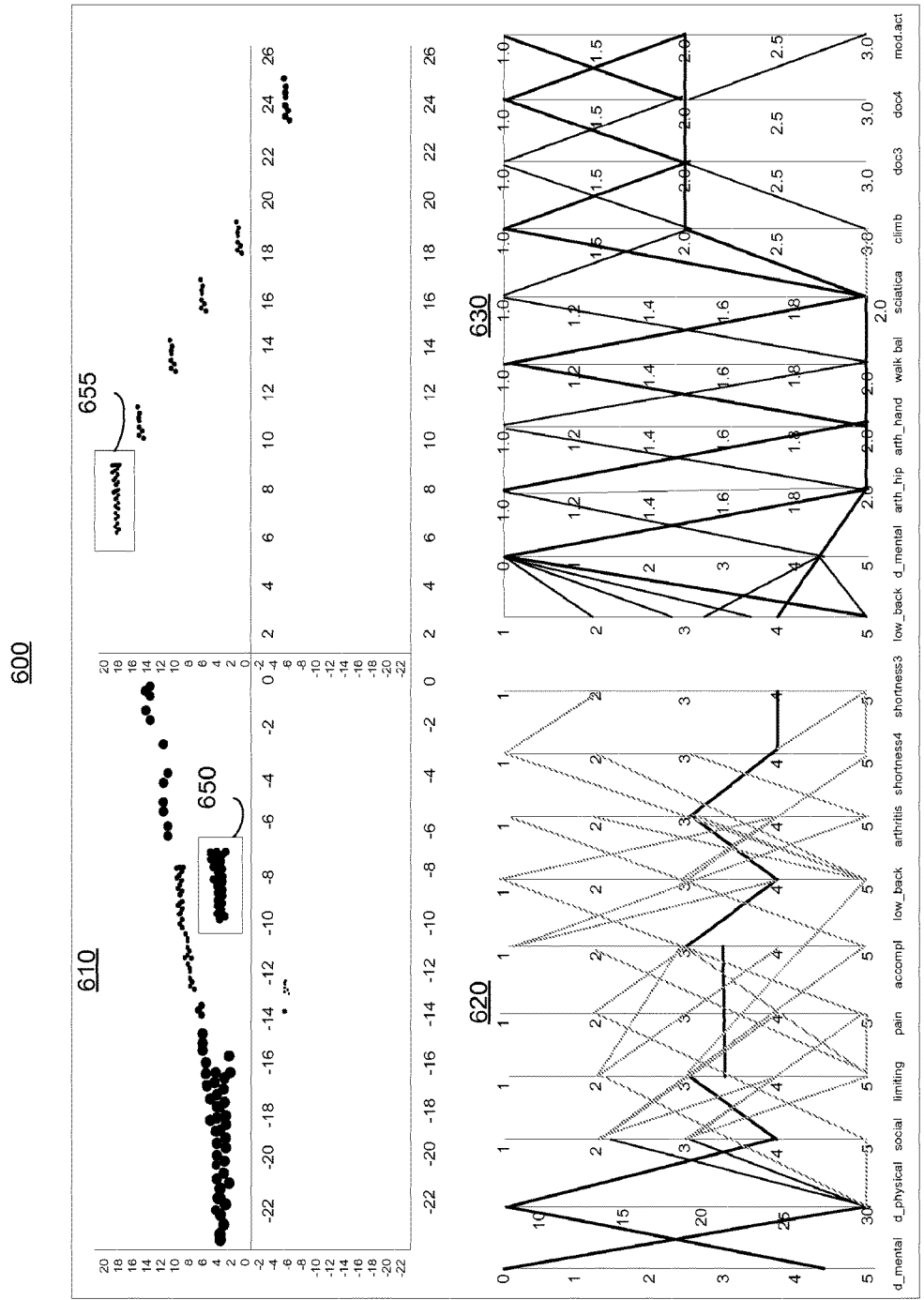
FIG. 6 shows a graphical user interface used to facilitate interpretation of high-dimensional data clusters, according to an example of the present disclosure.

At block 520, the dissimilarity module 114, for instance, receives a user selection of at least two of the clusters from the high-dimensional 2D projection 610. With reference to FIG. 6, for instance, the user has selected clusters 650 and 655 from a high-dimensional 2D projection 610 to analyze in more depth.

The dissimilarity module 114 may then extract a plurality of dissimilar dimensions (i.e., dissimilar attributes) from the at least two selected clusters, as shown in block 530. According to an example, the dissimilarity module 114 may extract a number of most dissimilar dimensions. In order to determine the most dissimilar dimensions from the at least two clusters, the dissimilarity module 114 may calculate a difference distribution for the plurality of dissimilar dimensions using a normalized attribute dissimilar measure and may rank the plurality of dissimilar dimensions based on the calculated difference distribution according to an example. The normalized attribute dissimilar measure may use normalized differences of each value in a dimension in the at least two clusters to calculate the difference distribution. For example, the normalized attribute dissimilar measure is calculated by $(\text{Diff}_{value1(A,B)} + \text{Diff}_{value2(A,B)} + \ldots)$ divided by a standard deviation to determine the most dissimilar dimensions, wherein A is all the dimensions in one cluster and B is all the dimensions in another cluster. A number of dimensions from the plurality of dissimilar dimensions may then be displayed in coordinate axis for analysis by the user or domain expert. According to an example, the number of displayed dimensions having the highest calculated difference distribution is displayed. With reference to FIG. 6, for instance, the top ten most dissimilar dimensions are displayed in the coordinate axis 620 in the lower left panel of GUI 600.

In block 540, the correlation module 116, for instance, may receive a user selection of a dissimilar dimension from the plurality of dissimilar dimensions. In block 550, in response to receiving the user selection of the dissimilar dimension from the plurality of dissimilar dimensions, the correlation module 116 may then determine a plurality of correlated dimensions (i.e., correlated attributes) to the at least one selected dissimilar dimension. That is, the user may reduce the dimensions by determining the most correlated dimensions to the selected dissimilar dimension. According to an example, the correlation module 116 may extract a number of correlated dimensions. In order to determine the most correlated dimensions to the user selected dissimilar dimension, the correlation module 116 may calculate a correlation distribution for the dissimilar dimension using a Peterson equation, for instance, and then may rank a plurality of correlated dimensions based on the calculated correlation distribution according to an example. A number of dimensions from the plurality of correlated dimensions may then be displayed in a coordinate axis for analysis by the user. According to an example, the number of dimensions having the highest calculated correlation distribution is displayed. With reference to FIG. 6, for instance, the top nine correlated dimensions are displayed with along with the user selected dissimilar dimension in the coordinate axis 630 in the lower right panel of GUI 600.

In block 560, the display module 118, for instance, displays the plurality of dissimilar dimensions and the plurality of correlated dimensions. Particularly, the display module 118 may display the clusters projected by the cluster module 112 to a 2D projection 610, as shown in FIG. 6. Further, the display module 118 may display a number of dimensions from the plurality of dissimilar dimensions and a number of dimensions from the plurality of correlated dimensions as coordinate axes 620, 630, as shown in FIG. 6. According to an example, the display module 118 highlights a path of a most traversed line in the coordinate axes 620, 630 by applying a scaled transparency to other lines in the coordinate axes 620, 630 to reduce overlapping of lines in the coordinate axes 620, 630.

According to an example, the method 500 may be performed iteratively to allow a user to refine their interpretations of clusters through interaction and reprojection of a data set, as discussed further with regard to method 800 in FIG. 8 below. For example, only the extracted plurality of dissimilar dimensions is reprojected to 2D space in the next iteration of the method 500 to differentiate refined clusters. The refined clusters are clusters that reveal finer structures and new patterns in the data based on a reprojection of the data using a smaller set of dimensions (i.e., smaller set of attributes), as shown in a high-dimensional 2D projection 700 in FIG. 7.

Figure 7:
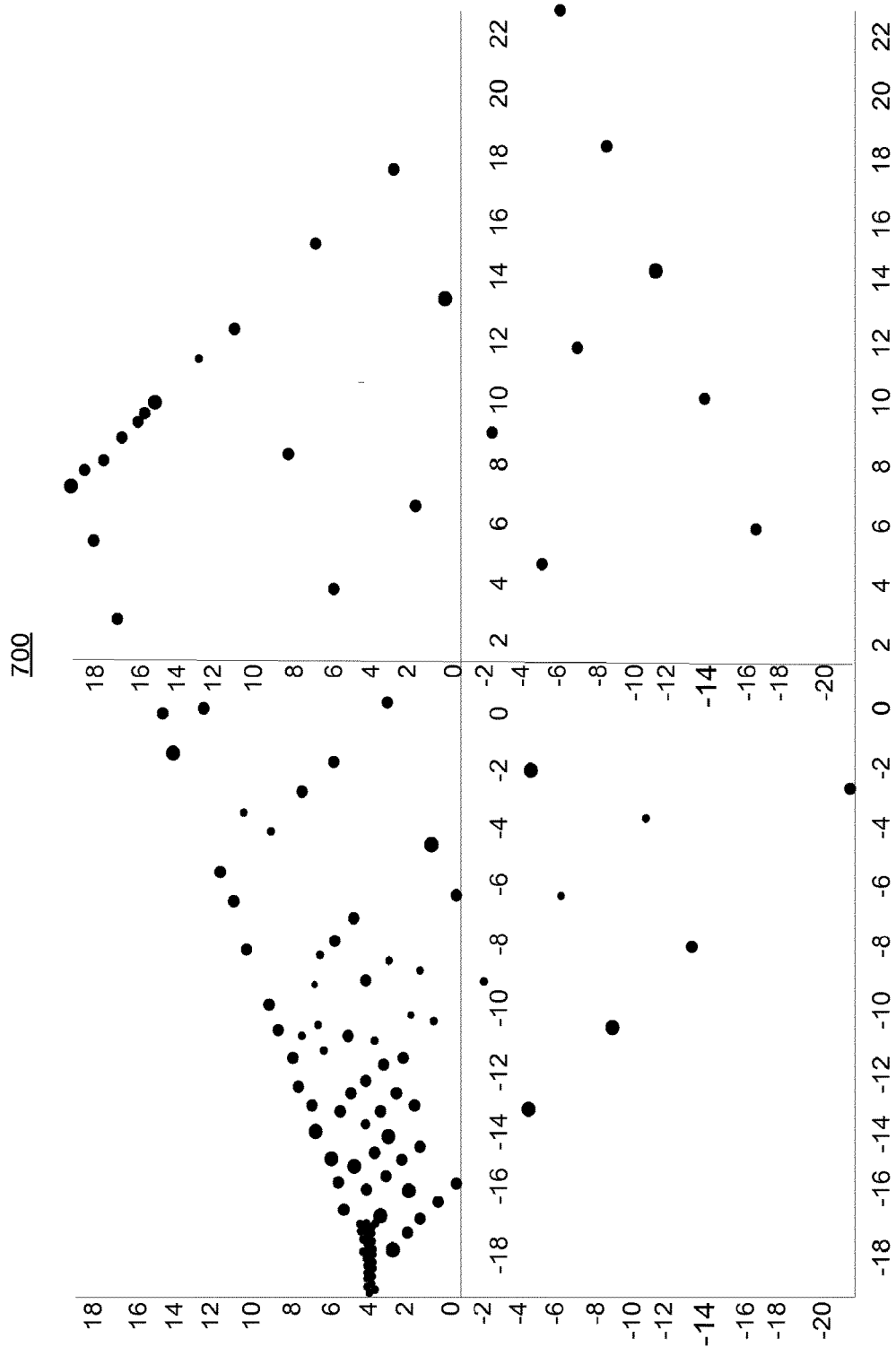
FIG. 7 shows reprojected high-dimensional data to multi-dimensional space, according to an example of the present disclosure.

In FIG. 7, the high-dimensional 2D projection 700 differentiates a reprojection of the extracted plurality of dissimilar dimensions. As compared to the high-dimensional 2D projection 610 in FIG. 6, the reprojected high-dimensional 2D projection 700 reveals finer structures and new patterns in the high-dimensional data. Because the at least two selected clusters may be maintained over the duration of several iterations, it is possible for a user to observe if and how the at least two selected clusters change. That is, some clusters form only in certain reprojections while others can be distinguished in all projections.

Figure 8:
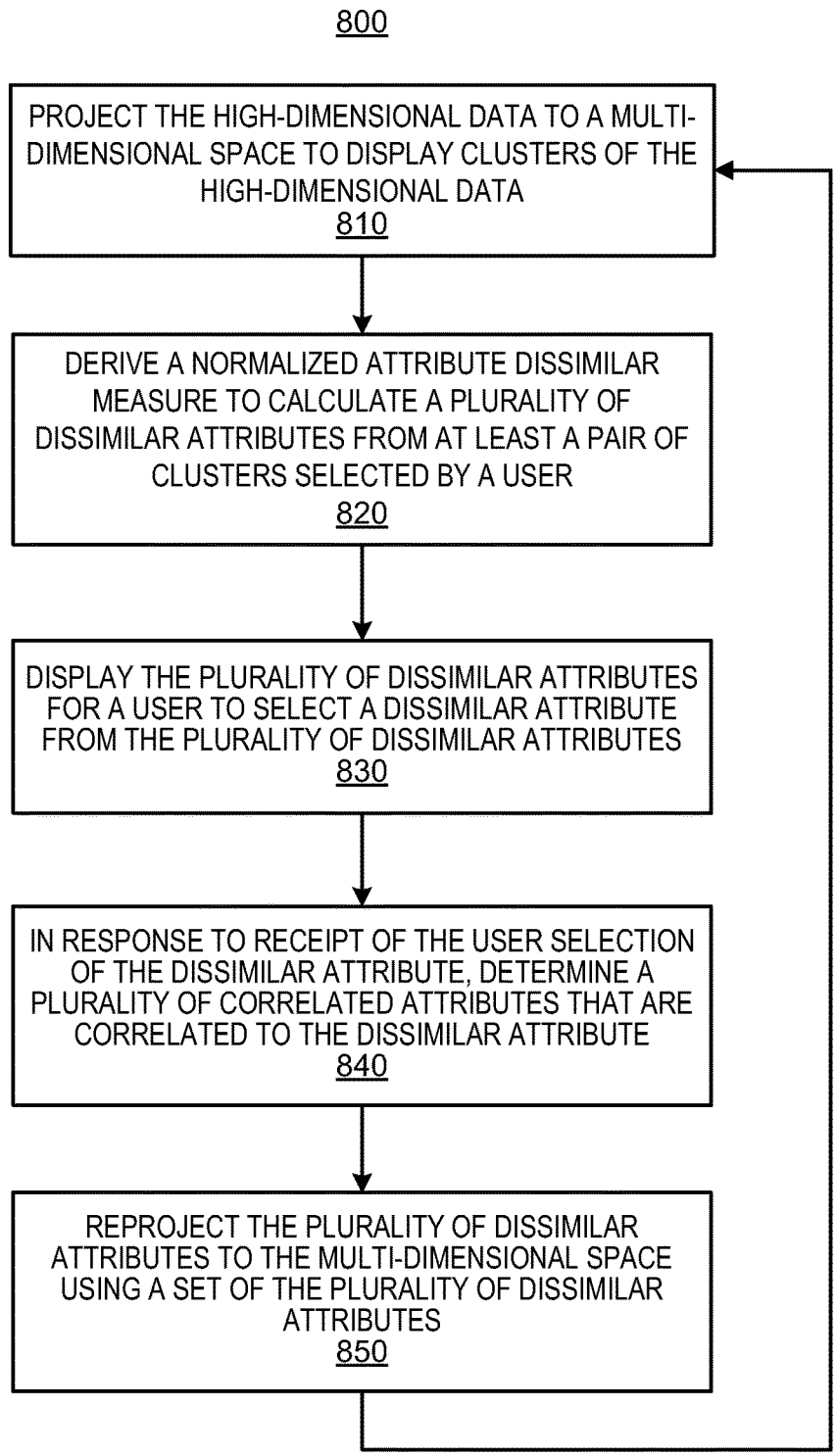
FIG. 8 shows a flow diagram of a method to iteratively and interactively facilitate interpretation of high-dimensional data clusters, according to an example of the present disclosure.

With reference to FIG. 8, there is shown a flow diagram of a method 800 for iteratively and interactively facilitating interpretation of clusters of high-dimensional data, according to an example of the present disclosure. The method 800 is implemented, for example, by the processor 102 of computing device 100 as depicted in FIG. 1.

In FIG. 8, the cluster module 112, for instance, projects high-dimensional data to a multi-dimensional space to display clusters of the high-dimensional data, as shown in block 810. A normalized attribute dissimilar measure is then derived by the dissimilarity module 114, for instance, to calculate a plurality of dissimilar attributes (i.e., dissimilar dimensions) from at least a pair of clusters selected by a user, as shown in block 820. The plurality of dissimilar attributes may then be displayed for a user to select a dissimilar attribute from the plurality of dissimilar attributes by the display module 118, as shown in block 830. In response to receipt of the user selection of the dissimilar attribute, the correlation module 116, for instance, may determine a plurality of correlated attributes (i.e., correlated dimensions) that are correlated to the dissimilar attribute, as shown in block 840. According to an example, the plurality of dissimilar attributes may be reprojected to the multi-dimensional space using a set of the plurality of dissimilar attributes, as shown in block 850.

Accordingly, the method 800 may be performed iteratively to allow a user to refine their interpretations of clusters through interaction and reprojection of a data set. For example, only the extracted plurality of dissimilar dimensions is reprojected to multi-dimensional space in the next iteration to differentiate refined clusters. The refined clusters are clusters that reveal finer structures and new patterns in the data based on a reprojection of the data using a smaller set of dimensions (i.e., smaller set of attributes), as shown in a high-dimensional 2D projection 700 in FIG. 7.

Accordingly, the disclosed examples may provide a simple, iterative method and system for a user to rapidly interpret and then validate clusters of high-dimensional data. The disclosed examples provide an iterative and interactive approach that uses an attribute dissimilar measure and a coordinate axis to facilitate visual interpretation of clusters in a high-dimensional space by users and continuously explore their interpretations and hypotheses in multiple industries such as the healthcare, communication, marketing, and technology industries.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for facilitating interpretation of clusters of high-dimensional data, comprising:
    projecting, by a processor, the high-dimensional data to a multi-dimensional space to differentiate clusters of the high-dimensional data;
    receiving a user selection of at least two of the clusters;
    extracting a plurality of dissimilar dimensions from the at least two selected to clusters;
    receiving a user selection of a dissimilar dimension from the plurality of extracted dissimilar dimensions;
    in response to receiving the user selection of the dissimilar dimension from the plurality of dissimilar dimensions, determining a plurality of correlated dimensions that are correlated to the dissimilar dimension; and
    displaying the plurality of dissimilar dimensions and the plurality of correlated dimensions.

2. The method of claim 1, wherein projecting further comprises iteratively projecting the plurality of dissimilar dimensions to the multi-dimensional space to display refined clusters of the high-dimensional data.

3. The method of claim 1, further comprising applying a multi-dimensional scaling to the high-dimensional data to differentiate the clusters.

4. The method of claim 1, wherein extracting the plurality of dissimilar dimensions further includes:
    calculating a difference distribution for the plurality of dissimilar dimensions using a normalized attribute dissimilar measure;
    ranking the plurality of dissimilar dimensions based on the calculated difference distribution; and
    displaying a number of dimensions from the plurality of dissimilar dimensions, wherein the number of dimensions have the highest calculated difference distribution.

5. The method of claim 1, wherein determining the plurality of correlated dimensions further includes:
    calculating a correlation distribution for the selected dissimilar dimension;
    ranking a plurality of correlated dimensions based on the calculated correlation distribution; and
    displaying a number of dimensions from the plurality of correlated dimensions, wherein the number of dimensions have the highest calculated correlation distribution.

6. The method of claim 1, wherein displaying the plurality of dissimilar dimensions and the plurality of correlated dimensions further includes:
    displaying the plurality of dissimilar dimensions and the plurality of correlated dimensions as coordinate axis.

7. The method of claim 6, wherein displaying the coordinate axis further includes:
    highlighting a path of a most traversed line in the coordinate axis by applying a scaled transparency to other lines in the coordinate axis to reduce overlap of lines in the coordinate axis.

8. A computing device to interpret clusters of high-dimensional data, comprising:
    a processor;
    a memory storing machine readable instructions that are to cause the processor to:
        project the high-dimensional data to a multi-dimensional space to display clusters of the high-dimensional data;
        derive a normalized attribute dissimilar measure to calculate a plurality of dissimilar attributes from at least a pair of clusters selected by a user;
        is display the plurality of dissimilar attributes for a user to select a dissimilar attribute from the plurality of dissimilar attributes;
        in response to receipt of the user selection of the dissimilar attribute, determine a plurality of correlated attributes that are correlated to the dissimilar attribute; and
        reproject the plurality of dissimilar attributes to the multi-dimensional space using a set of the plurality of dissimilar attributes.

9. The computing device of claim 8, wherein the machine readable instructions are further to cause the processor to apply a multi-dimensional scaling to the high-dimensional data to project the clusters.

10. The computing device of claim 8, wherein, to derive the normalized attribute dissimilar measure, the machine readable instructions are to cause the processor to:
    calculate a difference distribution for the plurality of dissimilar attributes using the normalized attribute dissimilar measure;
    rank the plurality of dissimilar attributes based on the calculated difference distribution; and
    display a number of attributes from the plurality of dissimilar attributes, wherein the number of attributes have the highest calculated difference distribution.

11. The computing device of claim 8, wherein, to determine the plurality of correlated attributes, the machine readable instructions are to cause the processor to:
    calculate a correlation distribution for the selected dissimilar attribute;
    rank a plurality of correlated attributes based on the calculated correlation distribution; and
    display a number of attributes from the plurality of correlated attributes, wherein the number of attributes have the highest calculated correlation distribution.

12. The computing device of claim 8, wherein the machine readable instructions are to cause the processor to:
    display the plurality of dissimilar attributes and the plurality of correlated attributes as coordinate axis; and
    highlight a path of a most traversed line in the coordinate axis by applying a scaled transparency to other lines in the coordinate axis to reduce overlap of lines in the coordinate axis.

13. A non-transitory computer readable medium to interpret clusters of high-dimensional data, including machine readable instructions executable by a processor to;
    project the high-dimensional data to a multi-dimensional space to display clusters of the high-dimensional data;
    receive a selection of at least two of the plurality of clusters;
    calculate a number of most dissimilar dimensions from the at least two selected clusters, wherein the number of most dissimilar dimensions have a highest difference distribution among all dimensions of the at least two selected clusters;

receive a selection of a dissimilar dimension from the number of most dissimilar dimensions;

calculate a number of most correlated dimensions to the selected dissimilar dimension, wherein the most correlated dimensions have a highest correlation distribution the selected dimension among all dimensions of the at least two selected clusters; and display the plurality of most dissimilar dimensions and the plurality of most correlated dimensions.

14. The non-transitory computer readable medium of claim 13, the machine readable instructions are executable by the processor to iteratively project the plurality of dissimilar dimensions to the multi-dimensional space to display refined clusters.

15. The non-transitory computer readable medium of claim 13, the machine readable instructions are executable by the processor to:

display the number of most dissimilar dimensions and the number of most correlated dimensions as a coordinate axis; and highlight a path of a most traversed line in the coordinate axis by applying a scaled transparency to other lines in the coordinate axis to reduce overlap of lines in the coordinate axis.

\* \* \* \* \*